United States Patent
Garrick

(10) Patent No.: US 8,945,443 B2
(45) Date of Patent: Feb. 3, 2015

(54) PROCESS FOR UTILISING WASTE DRILL CUTTINGS IN PLASTICS

(75) Inventor: Douglas Campbell Garrick, Aberdeen (GB)

(73) Assignee: Total Waste Management Alliance Limited, Aberdeen (GB)

( * ) Notice: Subject to any disclaimer, the term of this patent is extended or adjusted under 35 U.S.C. 154(b) by 0 days.

(21) Appl. No.: 14/124,721

(22) PCT Filed: Jun. 13, 2012

(86) PCT No.: PCT/GB2012/051338
§ 371 (c)(1),
(2), (4) Date: Dec. 8, 2013

(87) PCT Pub. No.: WO2012/172332
PCT Pub. Date: Dec. 20, 2012

(65) Prior Publication Data
US 2014/0110870 A1 Apr. 24, 2014

(30) Foreign Application Priority Data
Jun. 15, 2011 (GB) .................................. 1110007.0
Mar. 30, 2012 (GB) .................................. 1205789.9

(51) Int. Cl.
*B29C 70/42* (2006.01)
*B29C 70/02* (2006.01)
*E21B 41/00* (2006.01)
*E21B 21/06* (2006.01)

(52) U.S. Cl.
CPC ............. *B29C 70/025* (2013.01); *E21B 41/005* (2013.01); *E21B 21/066* (2013.01)
USPC ........................ 264/37.29; 588/255

(58) Field of Classification Search
None
See application file for complete search history.

(56) References Cited

U.S. PATENT DOCUMENTS

| 4,460,292 | A | 6/1984 | Durham et al. | |
|---|---|---|---|---|
| 6,381,899 | B1 * | 5/2002 | McDole | 47/58.1 R |
| 7,371,277 | B2 * | 5/2008 | Polston | 106/697 |
| 7,396,433 | B2 * | 7/2008 | Strand | 159/47.3 |
| 7,642,394 | B1 * | 1/2010 | Carle et al. | 588/321 |
| 8,007,581 | B2 * | 8/2011 | Scott et al. | 106/277 |
| 2009/0093665 | A1 | 4/2009 | Ross et al. | |

FOREIGN PATENT DOCUMENTS

| WO | WO 01/20122 A1 | 3/2001 |
|---|---|---|
| WO | WO 03/062592 A1 | 7/2003 |
| WO | WO 2005/023430 A1 | 3/2005 |
| WO | WO 2007/102743 A1 | 9/2007 |
| WO | WO 2008/000087 A1 | 1/2008 |
| WO | WO 2009/132361 A2 | 10/2009 |

OTHER PUBLICATIONS

Aird, Peter; "Drilling Waste Management Technology Descriptions"; Sep. 1, 2008; retrieved from Internet at: http://www.roughneckcity.com.
Unknown; "Drill Cuttings Recycling—Exploring the Options"; Feb. 24, 2009; retrieved from Internet at: http://www.oilonline.com.

* cited by examiner

*Primary Examiner* — Mary F Theisen
(74) *Attorney, Agent, or Firm* — Law Office of Jesse D. Lambert, LLC

(57) ABSTRACT

An environmentally beneficial process for utilizing waste drill cuttings from oil and gas exploration. The waste drill cuttings (20) are used as a filler and combined with plastic to provide a plastic based product (26) in the plastics industry. In an embodiment the cuttings are thermally treated and formed into pellets. In a further embodiment the cuttings are treated and mixed with recycled plastic to be formed into pellets. The pellets are then used in the manufacture of rigid plastic products such as bollards, planters, benches and decking.

20 Claims, 3 Drawing Sheets

PROCESS FOR UTILISING WASTE DRILL CUTTINGS IN PLASTICS

The present invention relates to a process for utilising waste drill cuttings and in particular, though not exclusively, to a process for creating plastic products by using the drill cuttings as a plastic filler.

In oil and gas exploration, wells are drilled through geological formations to access reservoirs. When the drill bit cuts through the geological formation, pieces of rock debris are generated. These are referred to as drill cuttings. The drill cuttings will also contain drilling fluid, or mud as it is commonly called. The mud is a mixture of liquids and solids designed to assist well drilling. The functions drilling mud performs include:

Lubrication and cooling of the drill bit;
Creation of a filter cake on the side wall of the well bore to limit fluid leakage from the geological formation into the well;
The creation of a hydrostatic pressure within the well bore to prevent the formation from caving into the well bore; and
The provision of a carrying medium to transport the drill cuttings and other contaminates away from the drill bit.

Drilling muds are fluids which may be based on water or oil. A weighting agent, usually barite, is added to increase the weight of the mud.

The drill cuttings are carried up the drill pipe annulus by the mud which is pumped down through the centre of the drill pipe. The factors that affect the size and consistency of the cuttings returned to the surface include:

Size and type of drill bit
Formation type i.e. sandstone, limestone, clay
ROP—Rate of penetration
Drilling fluid
Weight on bit
Rotational speed
Down hole stability
Depth The drill cuttings are carried up the well to the surface where they enter the flow line. From the flow line the mud and cuttings are carried to the shale shakers, where the cuttings are screened out of the mud. The mud is then returned to mud storage pits for reuse and the cuttings are conveyed or pumped to a disposal/recovery route. Mud cleaning centrifuges are another source of cuttings debris, mud is passed through to remove barite and other fines that can affect the mud properties.

From the shakers residual cuttings are dealt with as a waste material which comprises of solids from the formation, solids from the weighting agent within the mud (typically barite) as well as water and oil from the drilling fluid. Typically they have the following composition by weight:

70-75% solids
12.5-15% water
12.5-15% oil

Every year, on average, some 40,000 tonnes of oil contaminated drill cuttings are returned to shore from offshore drilling in the UKCS (UK Continental Shelf). This is a significant amount of waste with a major environmental impact which must be dealt with.

Techniques have been developed to treat the oil contaminated solids. The main treatment methods employed are thermal processes used to evaporate the entrained liquids prior to the recovered solids being sent to landfill.

One such treatment process is the TCC RotoMill® offered by the present Applicants and disclosed in WO 02092187 and WO 02088506. The TCC RotoMill® is a cylindrical mill that grinds the waste drill cuttings debris. The process then converts kinetic energy to thermal energy by creating friction in the waste. A drive unit rotates a series of shaft mounted hammerarms inside a barrel shaped process chamber. The solid particles are forced towards the wall of the process chamber where the kinetic energy from the rotating arms will be transformed to heat by friction. The liberated gases are discharged from the mill and passed through a cyclone where fine entrained rock particles are removed.

From the cyclone the gases pass to the oil and steam condensers from where the liquids are recovered as base oil and water. The rock powder is collected from the mill and cyclone.

This process enables the environmentally sensitive recovery of oils for them to be re-used. The recovered solids and waters are discharged into the environment. If operating offshore, these are disposed of either directly overboard as slurry or, currently, transported onshore to landfill. Currently around 30,000 tonnes of the rock powder is sent to landfill each year.

It is therefore an object of the present invention to provide an environmentally sensitive process for the utilisation of waste drill cuttings to prevent their disposal to landfill.

According to a first aspect of the present invention there is provided a process for the utilisation of waste drill cuttings wherein the waste drill cuttings are combined with plastic to provide a plastic based product in the plastics industry.

In this way the cuttings can be advantageously used as a filler. While the term filler is used, those skilled in the art will appreciated that this will cover extenders, bulking agents and other such functional additives.

Fillers are used within the plastics industry and are principally natural substances used to improve strength and lower the cost of the material. Usually mineral-based, fillers/extenders literally increase the overall "bulk" of the plastic. They are often used to replace expensive virgin plastic where the property changes this causes versus the virgin plastic is either useful for final resulting materials in use application and/or can be tolerated in the application without loss of end use functionality. Current fillers are typically talc, chalk, silicas and clays which are relatively expensive.

By replacing current fillers with the waste drill cuttings we are advantageously providing a cost saving to the plastics industry and creating environmental benefits by removing the need for mining and processing of virgin mineral fillers and preventing the need for landfilling the waste drill cuttings.

Preferably, the waste drill cuttings are treated to remove a majority of the entrained liquids. In this way, the drill cuttings can be provided in a particle size and density suitable for use as a filler.

The waste drill cuttings may be treated by thermal processes as are known in the art. Alternatively, or additionally, the waste drill cuttings may be treated by a milling process. More preferably, the waste drill cuttings are treated by the TCC RotoMill® process.

In this way, the waste drill cuttings form a very fine powder which principally comprises formation rock and the barite used as a weighting agent within the drilling fluids.

The powdered waste drill cuttings may be compressed to form pellets. Optionally, a binder may be mixed with the powder to assist in forming the pellets. The binder may be the minimum amount of a target plastic, typically 30% w/w facilitating the extrusion of the pellet format. Alternatively pelletisation may be achieved by inclusion of a small quantity (circa 5%-10%) of natural or synthetic wax.

By forming a pellet, the waste drill cuttings are more easily transportable to a plastic product manufacturer, than the dry loose powder.

Preferably, the plastic is a recycled plastic.

In this way, the plastic based product can be advantageously produced entirely from waste materials.

Preferably, the plastics are polymers currently used with inorganic fillers. Preferably also, the plastics are one or more from the basic polyolefin family, covering HDPE (High Density PolyEthylene), LDPE (Low Density PolyEthylene), LLDPE (Linear Low Density PolyEthylene) and PP (PolyproPylene). This would include but not be limited to other bulk polymers e.g. EVA, PVC (Polyvinyl Chloride), PS (Polystyrene), PET's (Polyethylene Terephthlate) and also engineering polymers e.g. Nylons, ABS, PC, PMMA.

Preferably the waste drill cuttings are incorporated into the plastic to levels of up to 70% w/w.

Preferably, the waste drill cuttings and plastic are used within a flow moulding process or extruder as is known in the art, to provide the plastic based product.

Preferably, the plastic based product is a rigid product. The plastic based product may be a bollard, bench, planter, decking or similar product which is currently provided as a rigid plastic.

Alternatively, the plastic based product may be a plastic pellet. In this way, a plurality of plastic pellets can then be used as the feed to a moulding or extrusion process to provide a further plastic based product.

The invention will now be described, by way of example only, with reference to the accompanying drawings, of which:

Figure 1:
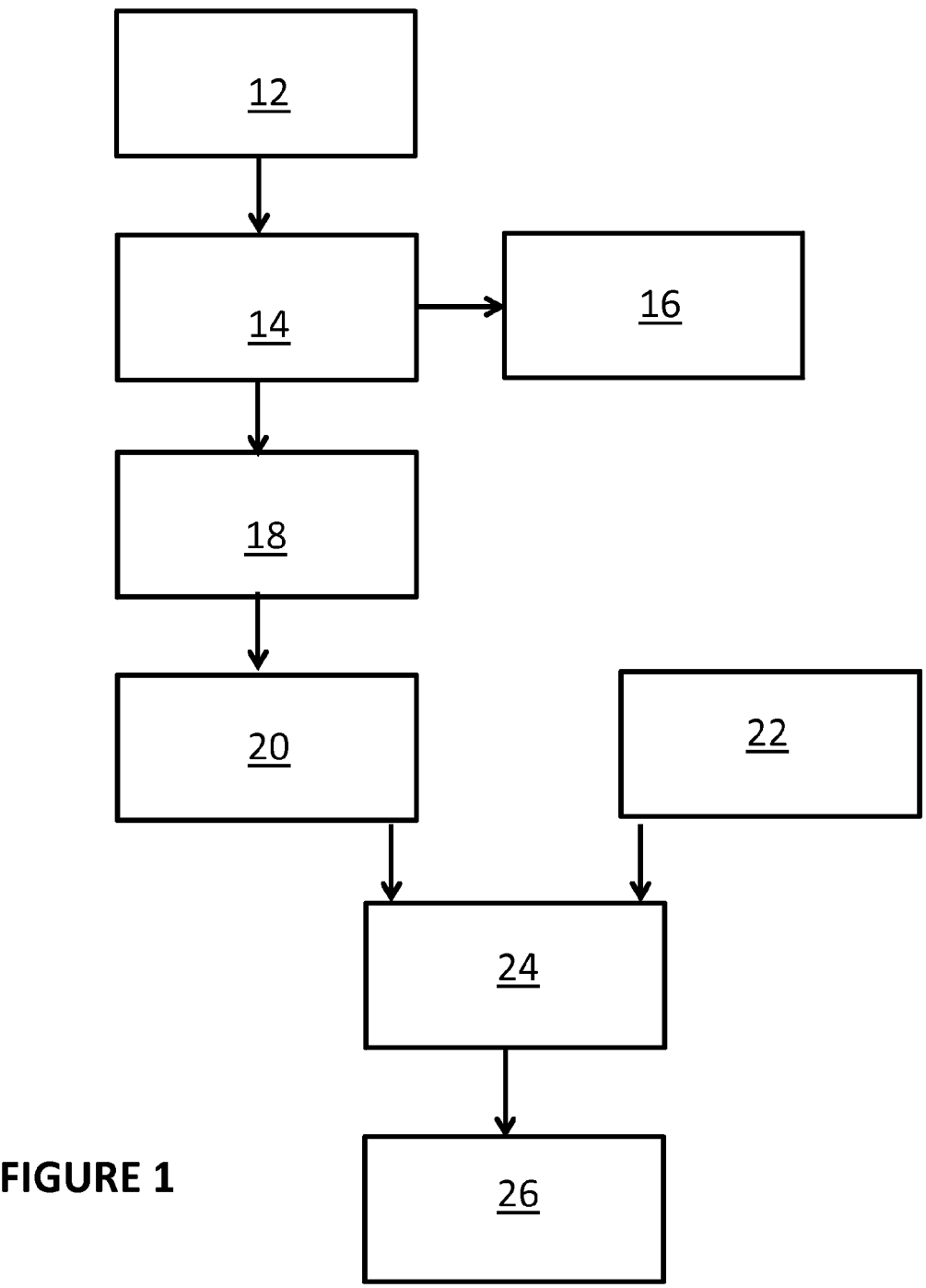
FIG. 1 is a flow chart for a process of utilising waste drill cuttings according to an embodiment of the present invention.

Referring initially to FIG. 1 of the drawings there is illustrated a process, generally indicated by reference numeral 10, for utilising waste drill cuttings 20 in the production of a plastic-based product 26 according to an embodiment of the present invention.

Drill cuttings 12 are a by-product in the process of drilling oil and gas wells. In order to achieve the cutting action and to drill a well a drilling fluid, typically referred to as mud 16, is pumped from the surface of the well through the drill pipe to exit at the drill bit. Drilling muds are fluids, which may be based on water or oil, a weighting agent usually barite is added to increase the weight of the mud. The pumping of mud through the drill pipe helps to lubricate and cool the drill bit. The mud is then used to carry the drill cuttings up the annulus of the drill pipe back to the surface of the well. In carrying out this task, the drilling mud also forms a filter cake on the side wall of the well, which limits the fluid leakage from the geological formation into the well. The mud further creates a hydrostatic pressure within the well which prevents the well from collapsing, where the formation falls in to the well bore.

The drill cuttings which are returned to surface can vary greatly in size and consistency depending on the size and type of the drill bit; the type of formation i.e. sandstone, limestone or clay; the rate of penetration of the drill pipe; the mud combination used; the weight applied to the drill bit and it's rotational speed; the downhole stability of the well; and the depth of drilling.

When the drill cuttings 12 reach the surface they are pumped through a flow line to shale shakers 14. The purpose of the shakers is to screen the solid cuttings 12 from the mud 16. In this way, the mud 16 can be recycled, being stored temporarily in pits until it can be pumped back down the drill pipe. While a shale shaker 14 is considered here, it will be recognised that there are other apparatus suitable for recovering the mud 16 from the drill cuttings 12. For example, centrifugal type systems have been adopted. It is noted that while the mud 16 is recycled, the drill cuttings 12 must now be disposed of.

Due to environmental considerations the dumping of drill cuttings, which will still have a quantity of oil upon them, is tightly regulated. Oil companies are now forced to treat the drill cuttings prior to disposal. There are a number of different types of treatment, but the majority rely on heating the drill cuttings in a treatment plant 18 so that any liquids within the cuttings 12 are evaporated off. Some treatment plants 18 are available for use offshore, allowing the waste drill cuttings 20 from the treatment plant 18 to be disposed of in the form of a slurry, dumped back at sea. If restrictions on dumping are tighter then the drill cuttings 20 must be brought onshore. These waste drill cuttings are then typically transported to landfill. There is limited space available in landfill sites, particularly in the UK now.

Consequently, a process which can remove the requirement of materials and waste to be deposited in landfill is considered advantageous. This is particularly in view of the UK government's aim for a zero waste economy and the Scottish governments current zero waste plan. Additionally, there are significant costs to dump tons of waste drill cuttings in landfill which must be borne by the oil companies or the companies offering treatment of the drill cuttings 12. When we consider that there are around 30,000 tonnes of waste drill cuttings 20 being sent to landfill in the UK every year it will be recognised that the removal of this requirement would not only save costs but would also be of great benefit to the environment.

In the present invention, the waste drill cuttings 20 are mixed with plastic 22. The plastics 22 may themselves be waste plastics, such as those formed from the offcuts of plastic moulding and forming facilities. The waste drill cuttings 20 are mixed with plastic 22 by any known process such as in a twin screw compounder. The incorporation of the waste drill cuttings 20 acts as a bulk filler or extender, and increases the stiffness of the produced plastic product 26. The resulting mixture is placed through a flow moulding process 24, to produce a plastic-based product 26.

Fillers are well known within the plastic industry. There are principally natural substances such as chalk and talc, which are used to improve the strength and lower the cost of the final plastic material. The current fillers i.e. chalk, talc, silicas and clays are specially mined to provide the filler materials as this is a cheaper operation than using virgin plastics. However, the mining and production of these valuable minerals is also harmful to the environment and carries a significant cost to the plastics industry.

Waste drill cuttings 12,20 in the form of the recovered solids have been used as fillers within the building and construction industry. Primarily they are used as a bulk filler within asphalt manufacture and for some cement product manufacture. This has proved successful on the basis that the waste drill cuttings 12,20 are primarily rock and this is mixed with similar rock material used in asphalt and concrete applications. Use of the drill waste cuttings 20 as a filler for the plastics industry is not the same as the material it is being mixed with is not of the same form. Additionally, while the waste drill cuttings 20 can be formed as a powder to mimic talc and chalk, the waste drill cuttings 20 have a proportion of oil remaining as a constituent part. Thus waste drill cuttings 20 would not be typically considered as a natural substitute for talc, chalk, silicas or clays.

For this invention it is considered that the presence of this waste oil adds a degree of extra functionality to waste drill cuttings, versus untreated fillers, in its role as a plastic filler. The oil residue does this by acting either as process lubricant and/or as a compatibiliser. A process lubricant acts to reduce the melt viscosity of the plastic filler blend, so easing the processing of the mix, reducing the energy required etc. A compatibiliser works by creating a molecular bridge between the hydrophilic inorganic particle surface and the hydrophobic polymer molecules so ensuring better bonding between the inorganic filler and the organic plastic. It is believed that such an improved bond may be what is allowing the plastics tested to resist embrittlement, in comparison to talc and chalk as the filler content rises. Talc, Silicas, Chalks and other inorganic fillers can usually be treated to increase their bonding to plastics but this normally adds considerably to their cost.

The invention herein described has discovered that the composition of the waste drill cuttings 20 has advantages over the current fillers used in the plastics industry. In particular, it has been found that the melt flow rates are reduced with increasing concentration of the waste drill cuttings, in the mix. This is a linear relationship and demonstrates that the process is suitable to be scaled for industrial applications. Apparent density increases with increasing concentration of waste drill cuttings, and this is comparable with talc. Additionally, flex modulus is increased with increasing concentration of recovered powder of the waste drill cuttings and whilst it does not have the functional performance of talc in boosting flex modulus, its presence enables the plastic to resist embrittlement at a much higher concentration than talc. This means for example that while 50% w/w drill cuttings are needed to achieve the flex modulus boost associated with a 30% w/w loading of talc, the 50% w/w drill cutting filled product also demonstrates ductility similar to 30% w/w talc loading. Similar performance results were found in terms of the flex yield strength testing.

The resulting mix of waste drill cuttings 20 and plastics 22 can be placed through a suitable moulding process 24 producing a rigid plastic-based product 26.

Currently, such plastic-based products are often produced using recycling plastic products these can include but are not limited to bollards, benches, planters, fencing, external facia and decking. These are all products that require an element of rigidity and the waste drill cuttings when used as a filler provides both rigidity and strength enhancement to the end use products it is included in.

The most adaptable format for the waste drill cuttings 20 in the process 10 is for the drill cuttings to be powdered. Advantageously in the preferred treatment process, the TCC RotoMill®, provides an output of powdered drill cuttings. The treatment process also removes a quantity of the residual oil present in the cuttings. Typically the process would need to output the waste drill cuttings with a residual oil content of less than 500 mg/kg to make them acceptable landfill. Advantageously, in the present invention, the residual oil content is preferably higher.

Figure 2:
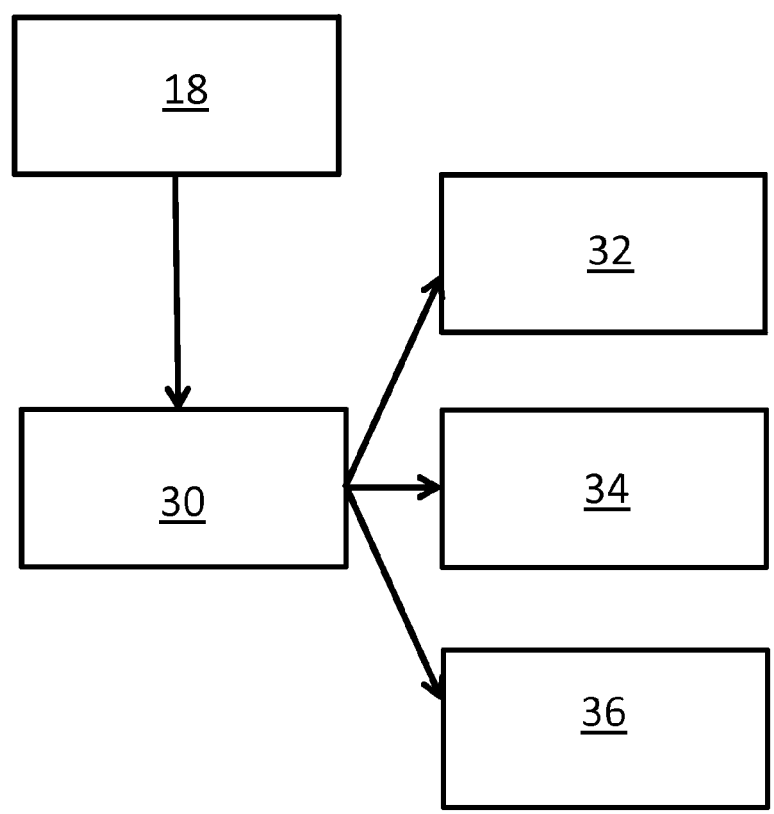
FIG. 2 is a flow chart illustrating a process for producing waste drill cuttings according to embodiments of the present invention.

Referring now to FIG. 2 of the drawings, there is illustrated a portion of the process wherein the powdered drill cuttings 30 are provided from the treatment plant 18. In the TCC RotoMill®, the reactor vessel is a mill chamber and the drill cuttings are effectively milled to a powder by rotating flails within the vessel. In the present invention, these powdered drill cuttings 30 are delivered to plastic manufacturers as a loose powder 32.

In trials, it has been discovered that the powdered drill cuttings 30 can contain a small but significant quantity of ferrous metals in the form of very fine shavings. The actual origin of these particles is unknown but is likely to be a combination of wear and tear on the drilling equipment including, the drill bit, drill pipe and shaker screens, metal contamination within the transfer system (including bolts and washers etc), wear and tear on the TCC RotoMill® process and wear on the blowline system which transfers the recovered powder into the storage silos. The presence of this metal could potentially cause wear and scoring of the barrels within the compounding and moulding equipment in a plastics plant. It is therefore an embodiment of the present invention, to include a step wherein the metal is removed from the powdered cuttings 30. Suitable metal extraction systems will be apparent to those skilled in the art of plastics manufacture.

In trials it has also been found that while the majority of the particles of powdered drill cuttings 30 are well within the range acceptable for the reuse within the plastics industry, a the residual small proportion that is oversized may cause problems in some applications (though as with the metal contamination—not all). Therefore, in a further embodiment of the present invention, particle size separation is carried out to ensure that all particles are within acceptable limits for the reuse within the plastics industry. The precise maximum size of particles will be dependent on the reuse application and particle sizing and separation can be used to provide several different grades of powdered drill cuttings 30. In an embodiment, the powdered cuttings 30 will be sorted to produce a grade of powder at <300 μm.

The powdered drill cuttings 30 may be compressed to form pellets 34 which can sometimes be more easily transportable than the loose powder or can allow the drill cutting filler to be used by those unable to handle powder addition. Alternatively, when the powder is compressed to pellets a binder agent may be incorporated to help in the formation of the pellets. This binder agent could be the target polymer for the chosen process in a 70% w/w filler masterbatch, or a small quantity (Circa 5%) of low molecular weight polymer or a plastic wax dependent on target market. In both cases the pellets 36 produced also have an increased stability and resistance to water uptake.

It is known that moisture present in a filler for use in the plastics industry is undesirable for the proposed reuse applications as during the processing temperatures in excess of 100° C. are used causing any entrained moisture to evaporate and expand which can result in poor quality products. While the cuttings powder 30 is dry when produced from the TCC RotoMill®, moisture is absorbed after this process as is common in powders with a high surface area. By use of suitable material handling guidelines and appropriate packaging as is known by those skilled in the art, it can be ensured that moisture uptake is minimised as required for reuse.

Figure 3:
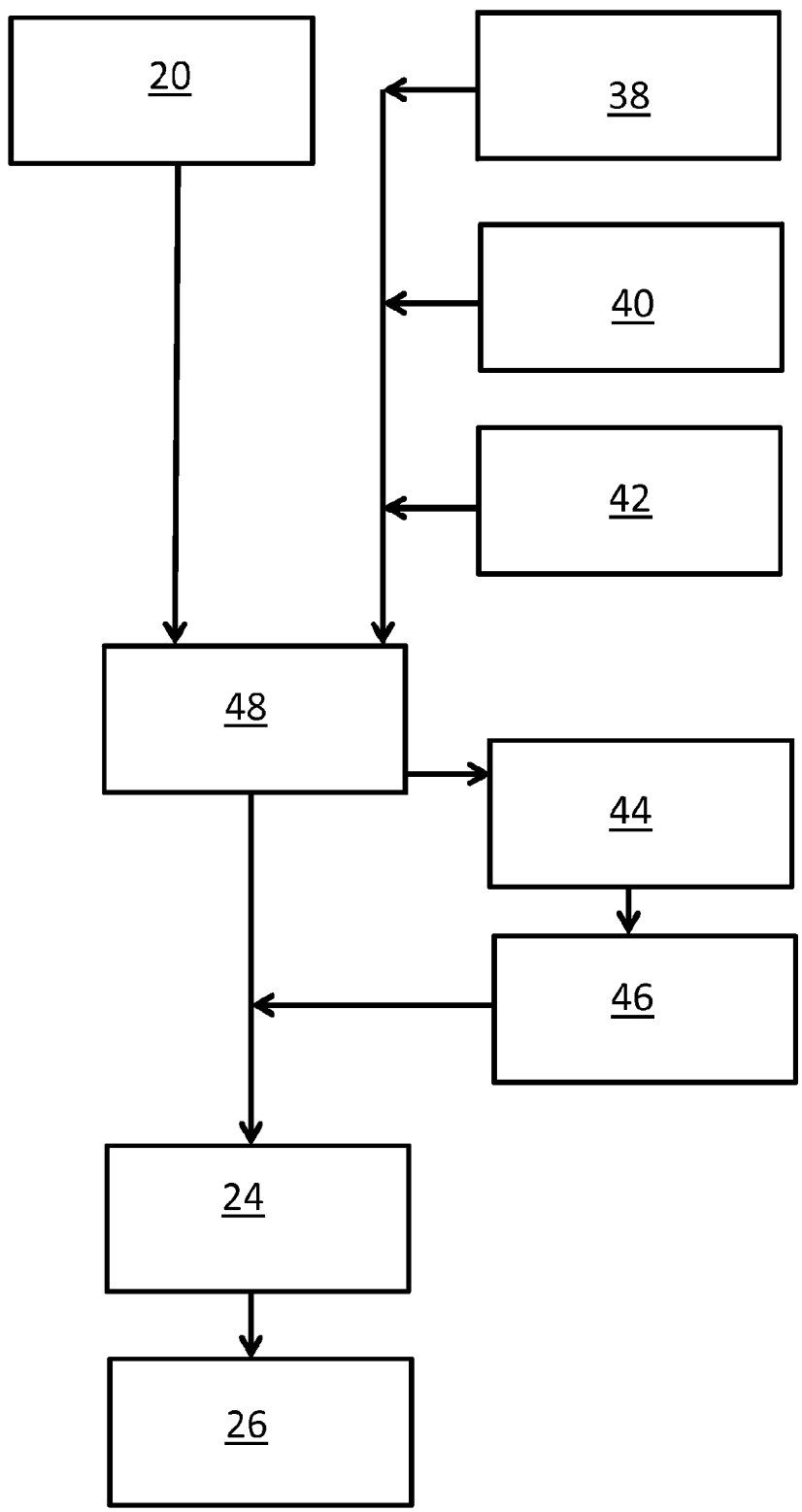
FIG. 3 is a flow chart illustrating processes of forming plastic based products according to further embodiments of the present invention.

Referring now to FIG. 3 of the drawings there is illustrated a process, generally indicated by reference numeral 50, for utilising waste drill cuttings 20 in the production of a plastic-based product 26 according to a further embodiment of the present invention.

This embodiment illustrates the possible combinations of materials used to form the plastic-based product 26. The waste drill cuttings 20, now in the form of loose powder 32, pellets 34 or pellets including a binder agent 36, are brought to the plastic manufacturing site. Plastics 38, 40, 42 are used as feed. While three plastics are illustrated any number, including only a single plastic may be used.

The plastics 38,40,42 are preferably from the basic polyolefin family, covering HDPE (High Density PolyEthylene), LDPE (Low Density PolyEthylene), LLDPE (Linear Low Density PolyEthylene) and PP (PolyproPylene), but those skilled in the art will recognise that plastics suitable for use with the drill cutting powder would include any polymers current used together with inorganic fillers. This would include but not be limited to other bulk polymers e.g. EVA, PVC (Polyvinyl Chloride), PS (Polystyrene), PET's (Polyethylene Terephthlate) and also engineering polymers e.g. Nylons, ABS, PC, PMMA. Any mixture of these plastics may be used. Advantageously any of these plastics may be waste plastics or recycled plastics as will be known to those skilled in the art.

The combination is mixed together by processes known to those skilled in the art, and findings have shown that the drill cuttings 32,34,36 can be readily incorporated into recycled high-density polyethylene 38 low-density polyethylene 40 and polypropylene 42 at levels up to 70% w/w. Additionally, the TCC RotoMill® output powder has been found to be easily processed for use as a plastic filler in suitable powder handling equipment and does not appear to cause significant wear to the internal workings of plastic process equipment.

A targeted mixture 48 can be directly fed to any standard plastic processing machine 24 including but not limited to injection-moulder, extruder, film blower, rota-moulder, to provide the plastic-based product 26. Alternatively, the mixture can be extruded 44 to form plastic pellets 46. These plastic pellets 46 can be stored and then transported when required to the plastic processing machine 24 for the production of the plastic-based product 26. Specifically the processing machine 24 can be a standard extruding machine with the addition of moulds facilitating the production of a standard commercial product. The mixture 48 above has been used in a process, as described in the last sentence, to produce rigid plastic decking. The resulting product was tested and found to have increased strength over decking produced without drill cuttings as a filler without significant loss of flexibility.

The principle advantage of the present invention is that it provides a method of utilising waste drill cuttings in the plastics industry so that the drill cuttings are not dumped in a landfill.

A further advantage of the present invention is that it provides a method of utilising waste drill cuttings together with waste plastics to provide a recycled plastic-based product, which is commercially useful.

A yet further advantage of the present invention is that it provides a process for utilising waste drill cuttings, allowing oil and gas operators to be fully compliant with the UK government's aim for a zero waste economy and the zero waste intentions of the Scottish government in their drilling operations.

Modifications may be made to the invention herein described without departing from the scope thereof. For example, while we have provided plastics in the form of HDPE LDPE and PP, it will be recognised by those skilled in the art that other plastics may be equally suitable to this process. In addition while the waste drill cuttings have been processed through a treatment plant described as the TCC RotoMill® as provided by the present applicant. It will be apparent to those skilled in the art that the recovered solids from most treatment plants used to treat waste drill cuttings could be utilised in this process, if their physical and chemical properties like the material produced in the TCC RotoMill® process also match closely enough those currently used in plastic filler e.g. treated drill cuttings with a 5 particle size greater than say, 500 μm which would be much more difficult to use in this application they would also be likely to cause damage to the processing equipment.

I claim:

1. A process for the utilisation of waste drill cuttings wherein the waste drill cuttings are combined with plastic to provide a plastic based product in the plastics industry.

2. A process according to claim 1 wherein the waste drill cuttings are a filler.

3. A process according to claim 1 wherein the waste drill cuttings are treated to remove a majority of the entrained liquids.

4. A process according to claim 1 wherein the waste drill cuttings are treated by a thermal process.

5. A process according to claim 3 wherein the waste drill cuttings are treated by a milling process.

6. A process according to claim 4 wherein the waste drill cuttings are treated by the TCC RotoMill® process.

7. A process according to claim 1 wherein the waste drill cuttings form a fine powder.

8. A process according to claim 7 wherein the powdered waste drill cuttings are compressed to form pellets.

9. A process according to claim 8 wherein a binder is mixed with the powder to assist in forming the pellets.

10. A process according to claim 9 wherein the binder is plastic material.

11. A process according to claim 1 wherein the plastic is a recycled plastic.

12. A process according to claim 1 wherein the plastic is selected from the basic polyolefin family.

13. A process according to claim 12 wherein the plastic is one or more of the group: high density polyethylene (HDPE), low density polyethylene (LDPE), linear low density polyethylene (LLDPE) and polypropylene (PP).

14. A process according to claim 1 wherein the waste drill cuttings are incorporated into the plastic to levels of up to 70% w/w.

15. A process according to claim 1 wherein the waste drill cuttings and plastic are used within a flow moulding process to provide the plastic based product.

16. A process according to claim 1 wherein the plastic based product is a rigid product.

17. A process according to claim 16 wherein the plastic based product is selected from a group comprising: a bollard, bench, planter, and decking.

18. A process for the utilisation of waste drill cuttings wherein the waste drill cuttings are combined with plastic to provide a plastic based product in the plastics industry and wherein the plastic based product is a plastic pellet.

19. A process according to claim 18 wherein the plastic based product is formed from a plurality of plastic pellets.

20. A process for the utilisation of waste drill cuttings wherein the waste drill cuttings are combined with plastic to provide a plastic based product in the plastics industry and wherein the waste drill cuttings form a fine powder and the powdered waste drill cuttings are compressed to form pellets.

* * * * *